June 14, 1932.  C. B. CONNELY  1,863,395
CONTROL SYSTEM
Filed Oct. 3, 1928
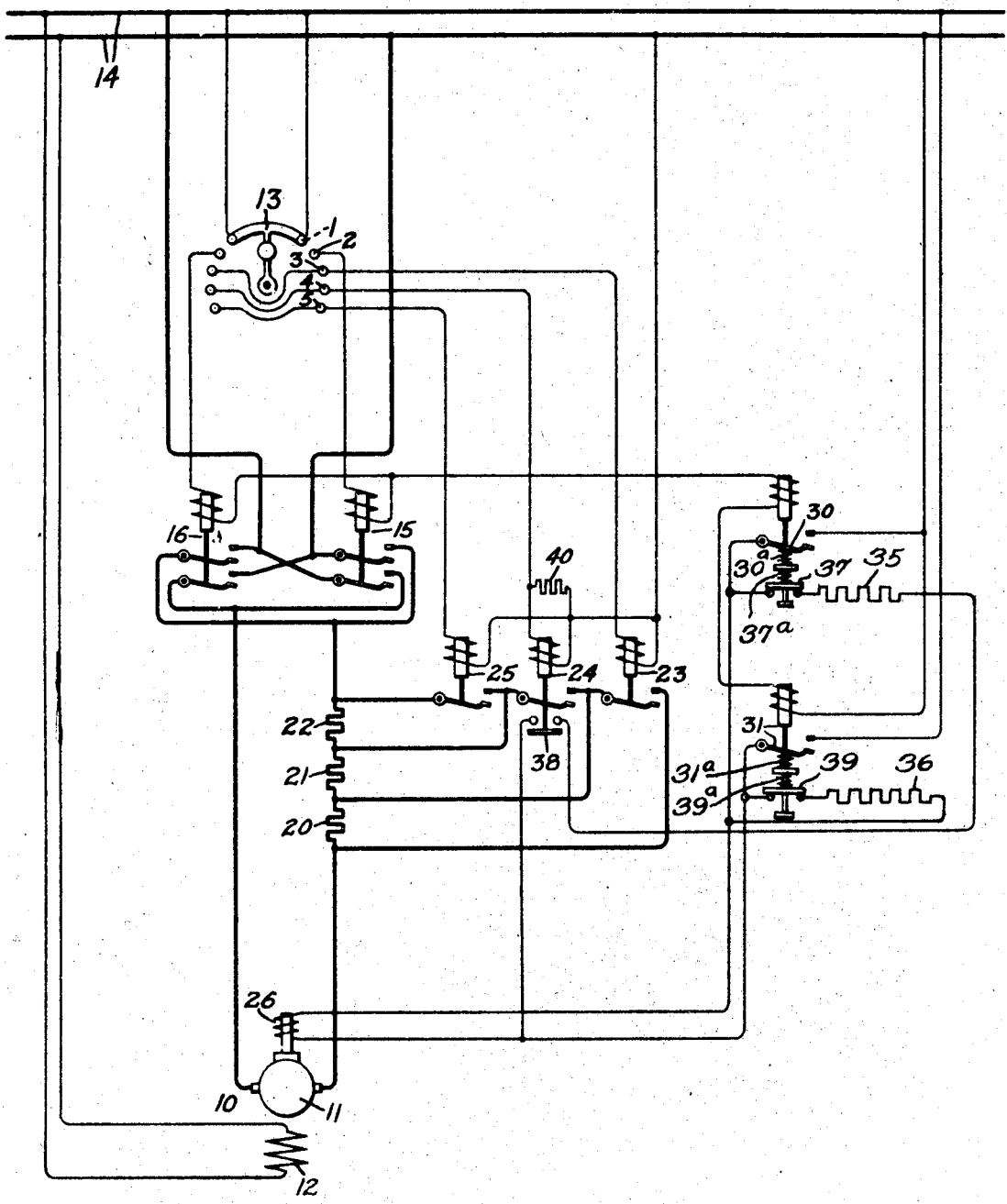
Inventor:
Charles B. Connely,
by Charles V. Tullar
His Attorney.

Patented June 14, 1932

1,863,395

UNITED STATES PATENT OFFICE

CHARLES B. CONNELY, OF BALLSTON, NEW YORK, ASSIGNOR TO GENERAL ELECTRIC COMPANY, A CORPORATION OF NEW YORK

CONTROL SYSTEM

Application filed October 3, 1928. Serial No. 310,097.

My invention relates to control systems, more particularly to control systems for motors, and has for its object the provision of a simple and efficient system of control whereby a braking effect may be applied at various desired predetermined rates.

Although it obviously has other applications, my invention is particularly useful in connection with electrically operated brakes provided for the braking of electric motors as for instance, those employed to operate cranes, elevators and like apparatus.

In elevator installations in particular, a smooth and easy deceleration of the operating motor is essential to avoid serious discomfort to the passengers as well as severe strains and shocks to the elevator mechanism. And further, it is very essential that the elevator car be brought to a positive stop at the desired positions. In order that the driving motor may effect a smooth and easy deceleration of the elevator car and yet positively bring the car to rest at the desired positions, the brake must be suitably controlled so that it will be applied at rates depending upon the speeds from which the motor is being decelerated. Thus, when the motor is being decelerated from relatively high speeds and is being brought to rest largely under the influence of dynamic braking, the brake must be slowly applied, while on the other hand, when the motor is being decelerated from relatively low speeds and thus necessarily must be brought to rest under the influence of the brake, the brake must be rapidly applied.

In one of its aspects, my invention contemplates the provision of braking mechanism employed to brake an elevator operating motor whereby the above mentioned desirable features will be obtained. That is, a slow application of the brake will be effected when the motor is decelerating from high speeds and is being brought to rest largely by dynamic braking, and a rapid application of the brake will be effected when the motor is decelerating from low speeds. Thus, braking characteristics conducive to comfortable and safe elevator operation are obtained.

In carrying my invention into effect in one form thereof, I provide control means for the brake arranged to effect suitable variations in the rate with which the brake is applied, and further cause the control means to operate in dependence upon the operation of the speed control means of the motor so that when the motor is decelerated from certain preselected speeds the brake will be quickly applied and when the motor is decelerated from other preselected speeds the brake will be slowly applied. As applied to an elevator system, I conveniently cause the control means to respond to movement of the master control switch so that when the switch is moved to the neutral position from positions corresponding to certain preselected speeds the brake will be quickly applied and when moved to the neutral position from positions corresponding to other preselected speeds the brake will be slowly applied.

For a more complete understanding of my invention reference should be had to the accompanying drawing in which the single figure is a diagrammatical representation of an elevator system provided with a brake controlled in accordance with my invention.

Referring to the drawing, I have shown my invention in one form as applied to an electrically operated brake provided for a direct current motor which may be arranged to drive any suitable device such as an elevator, hoist or the like. As shown, the electric motor 10, having an armature 11 and a separately excited field winding 12, is arranged to drive any suitable device such as an elevator. The motor is controlled by means of a suitable reversing master switch 13, which in an elevator control system will ordinarily be a car switch carried by the elevator car and operated by the elevator operator. The master switch 13 is arranged to control the motor 10 as to its direction of operation and as to its speed through a plurality of suitable directional and accelerating and speed controlling contactors.

As shown, the motor 10 is arranged to be connected to a suitable source of electrical supply 14 for the up direction of the elevator by means of the directional contactor 15, and to be connected to the source of supply 14 for the down direction of the elevator by means of the directional contactor 16. Each of these contactors controls contacts in the main motor circuit and, as is well understood, are energized to cause the motor to operate in the proper direction in response to movement of the master controller in the corresponding proper direction. Thus, movement of the controller in a clockwise direction, as viewed in the figure, will energize the operating coil of the up contactor 15 so as to close an operating circuit for the motor 10 to operate the elevator car in an up direction, and movement of the master controller in a counter-clockwise direction, as viewed in the figure, will energize the operating coil of the down contactor 16 so as to close an operating circuit for the motor to operate the elevator car in the down direction. As shown, the separately excited motor field winding 12 is conveniently energized from the supply source 14.

A plurality of resistors 20, 21 and 22 are included in series relation with the motor armature and are suitably controlled by means of a plurality of contactors 23, 24 and 25 respectively. It will be understood that the motor operating speed will be suitably controlled by varying the amount of resistance in the motor armature circuit. Thus, as is well understood, movement of the master switch in either direction from the first point of the switch will successively energize the operating coils of the contactors 23, 24 and 25. In consequence of this action, the resistors 20, 21 and 22 will be successively shunted so as to impress increasing voltages across the motor armature and thus cause the motor to operate at increasing speeds. The contactor 24 is arranged to open in response to a time interval for a purpose which hereinafter will be pointed out in detail.

The operating motor 10 is provided with a suitable brake, shown as an electrically operated brake 26. The brake 26 is provided with an operating coil and is so arranged that when the coil is energized the brake will be released and when the coil is deenergized the brake will be applied. The brake is further provided with suitable control mechanism whereby its operating coil may be energized at the proper times from a suitable supply source, as for instance, the supply source 14 so as to release the brake and whereby its operating coil may be deenergized at the proper times so as to apply the brake.

This control mechanism comprises two contactors 30 and 31 which, as shown, are connected in series relation with the directional contactors 15 and 16. Thus, when either of these directional contactors is energized so as to cause the motor to operate in the corresponding direction, the operating coils of the contactors 30 and 31 will likewise be energized so as to cause their associated contacts to close an energizing circuit for the operating coil of the brake whereby it will be released. This energizing circuit may be traced from the lower conductor of the supply source 14 through the contacts of the contactor 30, the operating coil of the brake, the contacts of the contactor 31 and thence to the upper conductor of the supply source 14.

It is very necessary in the operation of elevators that the operating motor be suitably braked during its decelerating period so as to bring the elevator car smoothly and positively to rest. It will be understood that when the motor is decelerated from high speeds, it is brought to rest largely under the influence of dynamic braking, and therefore, the motor brake must be applied slowly in order that the beneficial results that would be obtained from the dynamic braking will not be defeated. It will be further understood that when the motor is decelerated from low speeds, it must be brought to rest under the influence of the brake alone and therefore, the brake must be applied quickly in order to bring the car positively to rest.

In order to properly control the rapidity with which the brake will be applied, I conveniently employ the inherent characteristic of an electromagnet to remain energized when the supply current is cut off, provided there is a circuit through which current can flow when the supply current is interrupted. Thus, if the brake coil be included in a suitable local circuit at the instant the operating current is interrupted, the magetic field will be prevented from decreasing at a rapid rate and the application of the brake will be retarded accordingly.

It will be observed that by properly controlling this local circuit, the rate of brake application may be readily controlled. Thus I arrange my brake controlling system so that when the master controller 13 is moved to its neutral position from certain preselected positions, a suitable local circuit will be provided for the brake operating coil so that the brake will be applied at one rate, and when the controller is moved to its neutral position from other preselected positions, a suitable local circuit will be provided so that the brake will be applied at another rate.

In order to thus control the local circuits referred to, I provide suitable discharge paths of different values for the brake operating coil so that the coil may discharge at different rates and thus the brake be applied at different rates. As shown, I provide a suitable low resistance 35 arranged to be connected in multiple with the brake operating coil and placed under the joint control of an interlock 37 operated by the contactor 30 and an interlock 38 operated by the speed controlling contactor 24, and further provide another resistance 36 of relatively high value likewise arranged to be connected in multiple with the brake operating coil and placed under the control of an interlock 39 operated by the contactor 31.

It will be understood that when the high resistance 36 is connected in a closed circuit with the operating coil, a high resistance discharge path, or conversely a low rate discharge path will be provided for the coil, whereby the brake will be quickly applied. On the other hand when the low resistance 35 and the high resistance 36 are connected in multiple in a closed circuit with the brake coil, a low resistance discharge path, or conversely a high rate discharge path will be provided for the coil whereby the brake will be slowly applied.

It will be understood by reference to the drawing that when the contactor 31 is deenergized, the high resistance 36 will be connected in multiple with the operating coil of the brake but that when the contactor 30 is deenergized it will not necessarily follow that the low resistance 35 will be connected in multiple with the brake because the circuit of the resistance 35 is jointly controlled by the contactors 24 and 30. Thus in order to connect the low resistance 35 in multiple with the brake coil, it is necessary that both of the interlocks 37 and 38 bridge their respective contacts.

I have shown the interlocks 37, 38 and 39 operated by the respective contactors 30, 24 and 31 so that the resistances will be conveniently controlled in response to movement of the master controlling switch 13. It will be observed that when the master controlling switch is moved to its neutral position the supply current for the operating coils of the contactors 30 and 31 will be interrupted. As a result, the contactors 30 and 31 will operate immediately to close their respective associated interlocks 37 and 39, while the contactor 24 which opens in response to a time interval will tend to keep its associated interlock 38 closed. This retardation in the closing of the contactor 24 is desirable because it is necessary to retain the resistance 35 in multiple with the operating coil of the brake in response to a movement of the master controller from its higher speed positions, as for instance, when it is moved from the speed positions 4 or 5. A suitable overlap is provided between the closing of the interlocks 37 and 39 and the opening of their respective contactors 30 and 31, and as shown the movable contacts 30 and 31 and the interlocks 37 and 39 are connected to their operating armatures through springs 30a, 31a, 37a and 39a respectively. It will be observed that these operating connections are such that when the contactors 30 and 31 are deenergized, the interlocks 37 and 39 will close to establish the discharge paths before the contactors themselves open.

In order to retain the circuit through the resistance 35 complete when the master switch is so moved by causing the accelerating or speed controlling contactor 24 to operate as a timing device, as referred to above I connect a suitable discharge resistance 40 in a local circuit with the operating coil of the contactor 24 so as to limit its speed of opening. Thus, when the master controller is moved to its neutral position from the higher speed positions, the interlock 38 will not be opened immediately but will be opened an interval of time after the movement of the master controller, the time interval being determined by the proportions of the resistance 40. It will be understood that any suitable timing means may be provided for controlling the opening interval of the contactor 24.

It will be observed therefore, that should the master controller be moved to its neutral position from its high speed positions 4 or 5, the interlocks 37, 38 and 39 will all be closed and in consequence the resistances 35 and 36 will be connected in multiple with the operating coil of the brake. Thus, when the motor 10 is decelerated from high speeds the brake coil will be connected to discharge through a low resistance path and in consequence the brake will be slowly applied. On the other hand, should the master controller be moved to its neutral position from the third point, that is, the point corresponding to a partial motor speed, the interlocks 37 and 39 only will be closed. It will be understood that the higher speed contactors 24 and 25 will not have been closed since the controller has not been moved to its corresponding higher speed positions 4 and 5. In consequence of this action the brake coil will discharge through a relatively high resistance path and the brake will be quickly applied.

It will be observed that when the controller is moved from a high speed position through this partial speed position to the neutral position, the speed with which the controller is moved and the time interval delay of the contactor 24 in opening will determine the discharge paths for the brake coil. Thus, should the controller be rapidly moved from a high speed position through the partial speed to the neutral position, the coil will discharge through the low resistance path. However, should the controller be slowly moved through the partial speed position or should it be delayed at the partial speed position, the contactor 24 will have had an opportunity to open and the coil will discharge through the high resistance path. It will be obvious that the time interval of the contactor 24 may be varied so as to satisfy the braking requirements of any particular installation. Thus, even though the controller is rapidly moved from the high speed to the neutral position, the contactor 24 may be caused to open in such an interval that the brake coil will first discharge through the low resistance path and thereafter through the high resistance path. As a result the brake will be slowly applied during the initial decelerating period of the motor and then be rapidly applied to bring the motor to rest. On the other hand, the time interval in the opening of the contactor may be prolonged so as to cause the coil to discharge through the low resistance path for greater intervals of time.

In operation, it will be understood that the elevator operating motor 10 will be controlled by the master switch 13 to operate at any desired speed and in the desired direction. It will also be understood that the speed control contactors 23, 24 and 25 will have no influence upon either of the resistances 35 or 36 during the accelerating or running periods since simultaneously with the energization of the proper directional contactor 15 or 16, the contactors 30 and 31 will be closed so as to energize the brake coil, and the interlocks 37 and 39 will both be opened so as to interrupt the discharge circuits of the brake coil. Should the motor 10 be decelerated from rapid speeds because of movement of the master switch 13 to its neutral position from its high speed positions and be brought to rest largely under the influence of dynamic braking, the interlocks 37 and 39 will be immediately closed and the interlock 38 will be held closed due to the timing action of the accelerating contactor 24. The brake, 26, therefore, will be slowly applied so as to permit the motor to bring the car smoothly and easily to rest. Should the motor be decelerated from a relatively low speed, as, for instance, that corresponding to position 3 of the controller, the interlocks 37 and 39 will be immediately closed but the interlock 38 will be open and the brake will be quickly applied. It will be understood, as has been explained, that the timing of the contactor 24 may be varied so as to secure various braking characteristics.

Thus my brake control means, being operated in response to the position of the master controller, will effect a positive retardation of the operating motor regardless of the speed from which it is decelerated.

It will be obvious that the master controller may be provided with any number of speed positions, and further that any one of these positions may be so selected that deceleration from below the speed corresponding to the selected position will cause a rapid application of the brake while deceleration from the corresponding speed and those higher will cause a slow application of the brake. It will also be obvious that the brake may be caused to be applied at various preselected rates when the controller is moved to its neutral position from various preselected speed positions, since any number of resistances placed under the control of the proper accelerating and speed contactors may be employed to provide suitable discharge paths for the brake coil.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A system of control for an electric motor comprising preselective speed control means, braking means and control means for said braking means arranged to effect a variation in the rate at which said braking means is applied, said control means being responsive to the operation of said preselective speed control means and to a time interval so that when said control means is moved from a preselected speed position said braking means is quickly applied and when said control means is moved from another preselected speed position said braking means is applied at a slower rate for a predetermined interval of time.

2. In combination with an electric motor, preselective speed control means for said motor, a brake for said motor including an operating coil therefor, said brake being arranged so as to be applied when said coil is deenergized, means providing a relatively high rate discharge path for said coil, means providing a relatively low rate discharge path for said coil, means responsive to the operation of said preselective control means and a time interval arranged to control said high rate discharge path, whereby when said motor is decelerated from relatively high speeds said coil is discharged through said high rate path for a predetermined interval of time and means responsive to the operation of said preselective control means arranged to control said low rate discharge path, whereby when said motor is decelerated from relatively low speeds said coil is discharged through said low rate path.

3. In combination with an electric motor, preselective speed control means for said motor, a brake for said motor, means including a multi-position switch for controlling the direction of operation and the speed of said motor arranged so that said motor is caused to operate at increased speeds as said controller is moved to positions remote from its neutral position, a brake for said motor including an operating coil therefor, said brake being arranged to be applied when said coil is deenergized and control means for said brake comprising a relatively low resistance discharge path and a relatively high resistance discharge path for said operating coil said control means being arranged to respond to movement of said multi-position switch and to a time interval so that when said switch is moved to its neutral position from positions above a predetermined remote position said operating coil is discharged through said low resistance discharge path for a predetermined interval of time and when moved to its neutral position from positions below the predetermined remote position said operating coil is discharged through said high resistance discharge path.

4. A system of control for an electric motor comprising preselective speed control means, braking means for said motor including an operating coil therefor, said braking means being arranged so as to be applied upon the deenergization of said coil, high and low resistances arranged to provide discharge paths for said brake coil and means comprising a plurality of contactors and time element means arranged to control said resistances responsively to the operation of said preselective speed control means so that when said motor is decelerated from speeds below a predetermined value said high resistance is connected in multiple with said operating coil and when decelerated from speeds above the predetermined value both of said resistances are connected in multiple with said operating coil for a predetermined interval of time.

5. In combination with an electric motor, preselective speed control means for said motor, a brake for said motor including an operating coil for said brake, said braking means being arranged so as to be applied upon a deenergization of said coil, high and low resistances arranged to provide discharge paths for said brake coil and means for controlling said brake coil comprising a pair of contactors operative to close an operating circuit for said brake coil in response to operation of said preselective speed control means to energize said motor and to open said circuit in response to operation of said preselective speed control means to deenergize said motor, a time element device operative in response to operation of said preselective speed control means to cause said motor to operate at and above a predetermined speed and electrical connections controlled by said contactors and said time element device arranged so that when said motor is decelerated from speeds below the predetermined value one of said contactors operates to connect said high resistance in multiple with said brake coil and when said motor is decelerated from speeds at and above the predetermined value said timing device together with the other of said contactors operates to connect said low resistance in multiple with said brake coil and said one contactor operates to connect said high resistance in multiple with said brake coil the timing device thereafter disconnecting said low resistance.

6. In combination with an electric motor, means comprising a plurality of successively operated electro-responsive switches for controlling the motor speed, a multiple position master switch having a neutral position, a partial speed position and higher speed positions for controlling the motor through said electro-responsive switches, a brake for said motor including an operating coil for said brake, said brake being arranged so as to be applied when said operating coil is deenergized and control means for said brake comprising a high resistance and a low resistance arranged to provide high and low discharge paths for said brake coil, a plurality of contactors operated responsively to movement of said multiple position master switch from its neutral to any of its speed positions, an electromagnetic speed controlling switch corresponding to the first of said high speed positions, timing means for retarding the opening of said switch, and electrical connections between said brake coil and said resistances controlled by said contactors and said electromagnetic speed controlling switch so that when said master switch is moved from its neutral position to anyone of its speed positions said contactors operate to energize said brake coil, when moved to its neutral position from said first high speed position or those corresponding to higher speeds said contactors and timing means operate to connect said brake coil through the high discharge path for a predetermined interval of time and when moved to its neutral position from said partial speed position said contactors operate to connect said brake coil through the low discharge path.

7. A system of control for an electric motor comprising preselective speed control means, braking means and means responsive to the operation of said preselective speed control means including time element mechanism for controlling the rate at which said brake is applied so that when said motor is decelerated from certain preselected speeds said brake is applied at one rate and when said motor is decelerated from other preselected speeds said brake is applied at a different rate for a predetermined interval of time.

8. A system of control comprising a brake, a controller and means responsive to the movement of said controller including time element mechanism for controlling said brake so that when said controller is moved from a certain preselected position to another position said brake is quickly applied and when said controller is moved from a different preselected position to another position said brake is applied at a slower rate for a predetermined interval of time.

9. In combination with an electric motor, preselective speed control means for said motor, a brake for said motor, means including a multi-position switch arranged to control the direction of operation and the speed of said motor and control means for said brake responsive to the movement of said multi-position switch including a time element device, said control means being arranged so that when said switch is moved to its neutral position from its high speed positions said brake is applied at a comparatively slow rate for a predetermined interval of time and when moved to its neutral position from its low speed positions said brake is applied at a comparatively rapid rate.

10. A system of control for an electric motor comprising preselective speed control means, braking means for said motor including an operating coil therefor, said braking means being arranged so as to be applied when said operating coil is deenergized, a plurality of resistances, electrical connections between said brake coil and said resistances and means dependent upon the operation of said preselective speed control means including time element mechanism for controlling said electrical connections so that said resistances are connected to provide a low rate discharge path for said coil when said controller is moved from a low speed position to its neutral position and so that when said controller is moved from a high speed position to its neutral position said resistances are connected to provide a high rate discharge path for said brake coil for a predetermined interval of time.

11. A system of control for an electric motor comprising preselective speed control means, braking means for said motor including an operating coil therefor, said braking means being arranged so as to be applied when said coil is deenergized, a plurality of resistances, a source of electrical supply, switching mechanism for controlling said resistances to provide different rate discharge paths for the operating coil of said brake, electrical connections between said source of supply and said switching mechanism including said preselective speed control means so that when said control means is moved from a preselected speed position to decelerate said motor said switching mechanism is operated to establish a discharge path for said brake coil providing for the quick application of said brake and when said control means is moved from another preselected speed position to decelerate said motor said switching mechanism is operated to establish a discharge path for said brake coil providing for a slow application of said brake.

In witness whereof, I have hereunto set my hand this 2nd day of October, 1928.

CHARLES B. CONNELY.